US011044304B2

(12) United States Patent
Lohmar et al.

(10) Patent No.: US 11,044,304 B2
(45) Date of Patent: Jun. 22, 2021

(54) APPARATUS AND METHOD FOR SELECTING A CONTENT DISTRIBUTION NETWORK ENTITY TO IMPROVE RESOURCE UTILIZATION

(71) Applicant: Telefonaktiebolaget LM Ericsson (publ), Stockholm (SE)

(72) Inventors: Thorsten Lohmar, Aachen (DE); Ali el Essaili, Aachen (DE); Mohamed Ibrahim, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 99 days.

(21) Appl. No.: 16/325,897

(22) PCT Filed: Aug. 18, 2016

(86) PCT No.: PCT/EP2016/069592
§ 371 (c)(1),
(2) Date: Feb. 15, 2019

(87) PCT Pub. No.: WO2018/033205
PCT Pub. Date: Feb. 22, 2018

(65) Prior Publication Data
US 2019/0215361 A1    Jul. 11, 2019

(51) Int. Cl.
*G06F 15/16* (2006.01)
*H04L 29/08* (2006.01)
(Continued)

(52) U.S. Cl.
CPC ........ *H04L 67/10* (2013.01); *H04L 29/08153* (2013.01); *H04L 29/08171* (2013.01);
(Continued)

(58) Field of Classification Search
CPC ............... H04L 67/10; H04L 29/08153; H04L 29/08171; H04L 67/1004; H04L 67/1029;
(Continued)

(56) References Cited

U.S. PATENT DOCUMENTS 6,804,715 B1 * 10/2004 Koseki ................. H04L 69/329
709/224
9,544,346 B1 * 1/2017 Chakrovorthy ..... H04L 41/5058
(Continued)

FOREIGN PATENT DOCUMENTS

| WO | 2013163477 A1 | 10/2013 |
| WO | 2016081506 A1 | 5/2016 |

OTHER PUBLICATIONS

Niyato, Dusit, et al., "Controlled Coalitional Games for Cooperative Mobile Social Networks", IEEE Transactions on Vehicular Technology, vol. 60, No. 4, May 2011, 1812-1824.
(Continued)

*Primary Examiner* — Johnny B Aguiar
(74) *Attorney, Agent, or Firm* — Patent Portfolio Builders, PLLC

(57) ABSTRACT

A selecting apparatus configured to select out of a set of content distribution network (CDN) entities a CDN entity for distributing content to a client device is described. Content distribution by a CDN entity is associated with a resource consumption, for example in regard of processing load. The selecting apparatus is configured to receive service performance reports for multiple CDN entities of the set of CDN entities and to select, upon determining from one or more of the service performance reports that a service performance of a first CDN entity is above a first result, a second CDN entity for content distribution to a client device. The selection is performed subject to the constraints that a service performance of the second CDN entity is below a second threshold and resource consumption in regard of the second CDN entity is lower than a resource consumption in regard of the first CDN entity.

18 Claims, 11 Drawing Sheets

(51) Int. Cl.
*H04L 12/26* (2006.01)
*H04L 12/24* (2006.01)
*H04L 29/06* (2006.01)
*H04L 12/801* (2013.01)
*H04L 12/911* (2013.01)

(52) U.S. Cl.
CPC ........ *H04L 41/509* (2013.01); *H04L 41/5025* (2013.01); *H04L 43/0852* (2013.01); *H04L 43/16* (2013.01); *H04L 47/29* (2013.01); *H04L 47/70* (2013.01); *H04L 65/4084* (2013.01); *H04L 65/80* (2013.01); *H04L 67/1004* (2013.01); *H04L 67/1008* (2013.01); *H04L 67/1029* (2013.01)

(58) Field of Classification Search
CPC . H04L 67/1008; H04L 47/29; H04L 41/5025; H04L 65/80; H04L 65/4084; H04L 41/509; H04L 43/16; H04L 47/70; H04L 43/0852
USPC .......................................... 709/217, 219, 224
See application file for complete search history.

(56) References Cited

U.S. PATENT DOCUMENTS

| | | | | |
|---|---|---|---|---|
| 2004/0267930 A1* | 12/2004 | Giulio | ................. | H04L 67/1008 709/225 |
| 2005/0055700 A1* | 3/2005 | Singler | ............... | H04L 67/2819 719/311 |
| 2013/0013730 A1 | 1/2013 | Li et al. | | |
| 2014/0108671 A1* | 4/2014 | Watson | ................. | H04L 67/322 709/231 |
| 2014/0195651 A1 | 7/2014 | Stockhammer et al. | | |
| 2014/0344331 A1* | 11/2014 | Johns | ...................... | H04L 45/64 709/203 |
| 2014/0372569 A1 | 12/2014 | Bouazizi | | |
| 2015/0200831 A1* | 7/2015 | Douglis | .............. | H04L 61/1511 709/224 |
| 2015/0381692 A1* | 12/2015 | Giladi | ................ | H04N 21/4402 709/217 |
| 2016/0234069 A1 | 8/2016 | Coudurier et al. | | |
| 2019/0044787 A1* | 2/2019 | Richardson | ....... | H04L 29/12066 |

OTHER PUBLICATIONS

Oyman, Ozgur, et al., "Quality of Experience for HTTP Adaptive Streaming Services", QoE Management in Emerging Multimedia Services, IEEE Communications Magazine, Apr. 2012, 20-27.

Unknown, Author, "Cedexis for Video", Cedexis, Portland, OR, Sep. 2015, 1-18.

Unknown, Author, "Information technology—Dynamic adaptive streaming over HTTP (DASH)", International Standard, ISO/IEC 23009-1:2014(E), May 15, 2014, 1-196.

Zhao, Mingchen, et al., "Peer-Assisted Content Distribution in Akamai NetSession", IMC '13, Proceedings of the 2013 conference on Internet measurement conference, Oct. 23-25, 2013, 31-42.

3GPP, "3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 13)", 3GPP TS 26.247 V13.3.0, Jun. 2016, pp. 1-94.

* cited by examiner

1: Input: Number of clients $M$, number of clients devices for testing alternative CDN entities $M_t \ll M$, set of client devices allocated to alternative CDN entities $B(M_t)$, number of paths N, measured e2e distributin delay $d$, expected delay range $d_{lower}$ and $d_{upper}$, CDN distribution cost metric $cost_j$
2: Output: assignment client device $i$ to CDN entity $j$, where $i = 1:M$ and $j = 1:N$
3: Begin Procedure
4: $i = 1$
5: While $i < M$
6: If ($i \in B(M_t)$)
7: Allocate client device $i$ to a "non-preferable" path (i.e., $d_i > d_{upper}$)
8: Else
9: Determine path $j$ that minimizes distribution cost and satisfies delay condition (i.e., $d_{lower} \leq d_i \leq d_{upper}$)
10: END If
11: $i = i + 1$
12: END procedure
13: update $B(M_t)$

FIG. 10

APPARATUS AND METHOD FOR SELECTING A CONTENT DISTRIBUTION NETWORK ENTITY TO IMPROVE RESOURCE UTILIZATION

TECHNICAL FIELD

The present disclosure generally relates to distributing content via a network infrastructure to client devices. In more detail, a technique for selecting a content distribution network entity for a client device is described. The technique can be implemented in the form of an apparatus, a network node, a network system, a client device, a method and a computer program.

BACKGROUND

Content providers are increasingly using third-party Content Distribution Network (CDN) technologies to realize their content offerings. As such, content providers tend to no longer operate the infrastructure underlying their content offering themselves. Instead, they utilize "as a service" offerings, for example from a CDN provider. Some CDNs just build on public cloud infrastructures. Other CDN providers deploy own caches inside of operator networks.

Today, client devices typically only connect to a single CDN. CDN nodes can do redirects to other CDN nodes in order to balance the load over multiple network nodes.

CDN providers need to provide content in a scalable and efficient manner to the client devices of end-users. To this end, CDNs target at placing content close to the client devices. For example, CDNs replicate content in a cached manner at different locations using so-called edge servers.

The content rendering quality—or, in general, the service performance—as perceived by end-users substantially depends on edge server locations and CDN node connectivity. When a CDN provider provides good connections in a certain area (e.g., has cache node appliances on edge servers close to the client devices), then the perceived content rendering quality in that area is high. As a consequence, the traffic volume typically will also be high in such situations. A higher traffic volume, in turn, implies higher resource consumption from various perspectives. For example, a higher traffic load on the CDN and higher costs for the content provider (as the CDN provider typically charges the content provider based on delivered traffic volume) will ensue.

Another service performance aspect from the perspective of the client devices is the end-to-end distribution delay. A high distribution delay will in many content distribution scenarios have a negative impact on the Quality of Experience (QoE) or similar service performance metrics. To guarantee short distribution delays, sophisticated technical resources have to be implemented in the CDNs and in the CDN access networks between the CDNs and the client devices.

Consequently, the general objective to provide the best possible service performance to client devices leads to a high resource consumption on the side of the CDNs and the networks used to access the CDNs. Moreover, the use of more sophisticated technologies (e.g., in terms of CDN node availability or CDN access) to achieve a high service performance leads to higher costs for content distribution and, thus, of content consumption. It has been found that it would be desirable to implement a CDN selection technique that leads to better results in regard of resource consumption while providing a sufficient service performance for the client devices.

SUMMARY

Accordingly, there is a need for a CDN selection technique that improves resource utilization without a significant impact on service performance.

According to a first aspect, a selecting apparatus is presented to select out of a set of CDN entities a CDN entity for distributing content to a client device, wherein content distribution by each CDN entity is associated with a resource consumption. The selecting apparatus is configured to receive service performance reports for multiple CDN entities of the set of CDN entities. The selecting apparatus is further configured to select, upon determining from one or more of the service performance reports that a service performance of a first CDN entity is above a first threshold, a second CDN entity for content distribution to a client device subject to two or more constraints. The constraints include at least that (i) a service performance of the second CDN entity is below a second threshold, and that (ii) a resource consumption in regard of the second CDN entity is lower than a resource consumption in regard of the first CDN entity.

The selecting apparatus may be further configured to trigger at least one action that causes the client device to receive content from the selected second CDN entity. For example, the at least one action may cause the client device to switch content reception from the first CDN entity to the second CDN entity. In case the client device is not yet receiving content, the at least one action may simply cause the client device to initiate content reception from the second CDN entity.

The at least one action may be performed by the selecting apparatus itself. Alternatively, the selecting apparatus may trigger at least one other apparatus to perform the at least one action.

In one variant, the at least one action comprises indicating the second CDN entity in a manifest file. The manifest file may contain metadata necessary for the client device (e.g., for a media player installed on the client device) to receive content. The at least one action may further comprise triggering transmission of the manifest file that indicates the second CDN entity to the client device.

The service performance reports may be received from multiple client devices. As such, the selecting apparatus may further be configured to trigger content distribution from the multiple CDN entities to the multiple client devices. In this way, reception of the service performance reports for the multiple CDN entities from the multiple client devices and at the selecting apparatus may be enabled.

Triggering content distribution from the multiple CDN entities to the multiple client devices may comprise triggering at least one action that causes individual ones of the multiple client devices to receive content from individual ones of the multiple CDN entities. Suitable actions in this regard (including the use of suitable manifest files) have been described above and will be described below.

In one implementation, the at least one action causes a first number of client devices to receive content from the first CDN entity being lower than a second member of client devices to receive content from the second CDN entity. The first number may at least be one (1) to enable reception of a service performance report also for the first CDN entity.

In one variant, the second threshold is below the first threshold. In this manner, hysteresis effects may be realized to avoid a repeated switching of an individual client device between two or more CDN entities within a short amount of time. In another variant, the second threshold may equal the first threshold.

The second CDN entity may be selected subject to the further constraint that (iii) the service performance of the second CDN entity is above a third threshold. The third threshold may be below the first threshold. In this manner, the second CDN entity may be selected for content distribution only if the service performance of the second CDN entity is within a service performance target range bound by the first threshold and the third threshold.

Additionally, or in the alternative, the second CDN entity may be selected according to constraint (ii) subject to having the minimal resource consumption among a plurality of CDN entities fulfilling at least constraint (i). Thus, if multiple potential second CDN entities fulfill (at least) constraints (i) and (ii), then the particular second CDN entity may be selected that minimizes resource consumption among all potential second CDN entities.

The selecting apparatus may further be configured to derive the service performance of a particular CDN entity for a particular client device. In this regard, the selecting apparatus may take into account two or more parameters, including (i) one or more service performance metrics reported for the particular CDN entity and (ii) a technical capability of the particular client device. As an example, the technical capability of the particular client device may be indicative of at least one of a screen size and audio playback capabilities of the particular client device. The technical capabilities of the client devices may be received by the selecting apparatus from a central database or from the client devices (e.g., together with the service performance reports).

The set of CDN entities may comprise one, two or more individual CDNs. Additionally, or in the alternative, the set of CDN entities may comprise one, two or more individual access network types per CDN. As such, the set of CDN entities may be defined by a set of CDN identifiers and/or a set of 2-tuples each indicative of an access network type and a CDN identifier.

The service performance may be indicative of a content distribution delay for a particular CDN entity. The content distribution delay may in particular be an end-to-end (e2e) distribution delay. The e2e distribution delay may stretch up to the client device and include delay components caused by the particular CDN entity.

Additionally, or in the alternative, the service performance may be indicative of a media rendering (e.g., visual or audible) quality for a particular CDN entity. As explained above, in certain variants the service performance may be derived from both of at least one media quality metric reported for a particular CDN entity and a technical capability of the particular client device (e.g., to determine a media rendering quality for the particular client device).

The selecting apparatus may further be configured to receive information on resource consumption for multiple CDN entities within the set of CDN entities. The resource consumption may be expressed as or derived from at least one of a traffic load parameter of a particular CDN entity and a traffic volume cost parameter associated with a particular CDN entity.

The selecting apparatus may further be configured to receive, from the set of client devices, traffic volume reports for the set of CDN entities. In such a scenario the selecting apparatus may also be configured to aggregate the reported traffic volumes per CDN entity (e.g., over all client devices consuming content from that CDN entity). Moreover, the selecting apparatus may calculate the resource consumption (e.g., the traffic volume cost) for a particular CDN entity based on the reported traffic volumes aggregated for that CDN entity and the traffic volume cost indication associated with that CDN entity. The traffic volume cost indication may be a simple parameter or a more complex function.

Also provided is a network node comprising the selecting apparatus as presented herein and an interface to multiple client devices. The interface is configured to send CDN entity selection instructions for the client devices (e.g., directly to the client devices) and to receive service performance reports for the CDN entities from the client devices.

Further provided is a network system comprising the network node and multiple client devices.

According to a further aspect, a client device configured to switch from a first CDN entity to a second CDN entity for content reception is provided. The client device is configured to monitor service performance for the first CDN entity while receiving content therefrom and to the send a report regarding the service performance monitored for the first CDN entity. The client device is further configured to receive an instruction to switch to the second CDN entity upon (i) a service performance of the first CDN entity being above the first threshold, (ii) a service performance of the second CDN entity being below a second threshold, and (iii) a resource consumption in regard of the second CDN entity being lower than a resource consumption in regard of the first CDN entity. The client device is also configured to switch to the second CDN entity responsive to receipt of the instruction.

The constraints may be evaluated locally at the client device, remotely (e.g., by the selection apparatus) or partially locally and partially remotely.

The client device may further be configured to monitor a traffic volume of content received from at least one of the first and the second CDN entity. Moreover, the client device may be configured to send a report regarding the monitored traffic volume (e.g., per CDN entity and/or per time unit). The report may be sent to the selecting apparatus, the network node or the network system described herein.

Also provided is a method of selecting out of a set of CDN entities a CDN entity for distributing content to a client device, wherein content distribution by each CDN entity is associated with a resource consumption. The method comprises receiving service performance reports for multiple CDN entities of the set of CDN entities and selecting, upon determining from one or more of the service performance reports that a service performance of a first CDN entity is above a first threshold, a second CDN entity for content distribution to a client device. The selection is performed subject to the constraints that (i) a service performance of the second CDN entity is below a second threshold, and that (ii) a resource consumption in regard of the second CDN entity is lower than a resource consumption in regard of the first CDN entity.

Also provided is a method of switching a client device from a first CDN entity to second CDN entity for content reception. The method is performed by the client device and comprises monitoring service performance for the first CDN entity while receiving content therefrom, sending a report regarding the service performance monitored for the first CDN entity, and receiving an instruction to switch to the second CDN entity. The instruction is received upon (i) a service performance of the first CDN entity being above a first threshold, (ii) a service performance of the second CDN entity being below a second threshold, and (iii) a resource consumption in regard of the second CDN entity being lower than a resource consumption in regard of the first CDN entity. The method further comprises switching to the second CDN entity responsive to receipt of the instruction.

The methods above may include one or more further steps as explained herein.

Also provided is a computer program product comprising program code portions to perform the steps of any of the methods and method aspects presented herein when the computer program product is executed on one or more processing devices. The computer program product may be stored on one or more computer-readable recording media, such as semiconductor memories, CD-ROMS, DVDs, and so on. The computer program product may in one example be distributed among various components of a virtualized communication system.

BRIEF DESCRIPTION OF THE DRAWINGS

Further details of embodiments of the technique are described with reference to the enclosed drawings, wherein:

FIG. 10 is a pseudo-code representation illustrating a further embodiment according to the present disclosure.

DETAILED DESCRIPTION

In the following description, for purposes of explanation and not limitation, specific details are set forth, such as specific CDNs, specific CDN access networks and specific network environments, in order to provide a thorough understanding of the technique disclosed herein. It will be apparent to one skilled in the art that the technique may be practiced in other embodiments that depart from these specific details.

Moreover, those skilled in the art will appreciate that the services, functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computing device, e.g., including an Advanced RISC Machine (ARM). It will also be appreciated that while the following embodiments are primarily described in context of methods and devices, the present disclosure may also be embodied in a computer program product as well as in a system comprising a computer processor and memory coupled to the processor, wherein the memory is encoded with one or more programs that may perform the services, functions, or steps and implement the units disclosed herein when executed on the processor.

Figure 1:
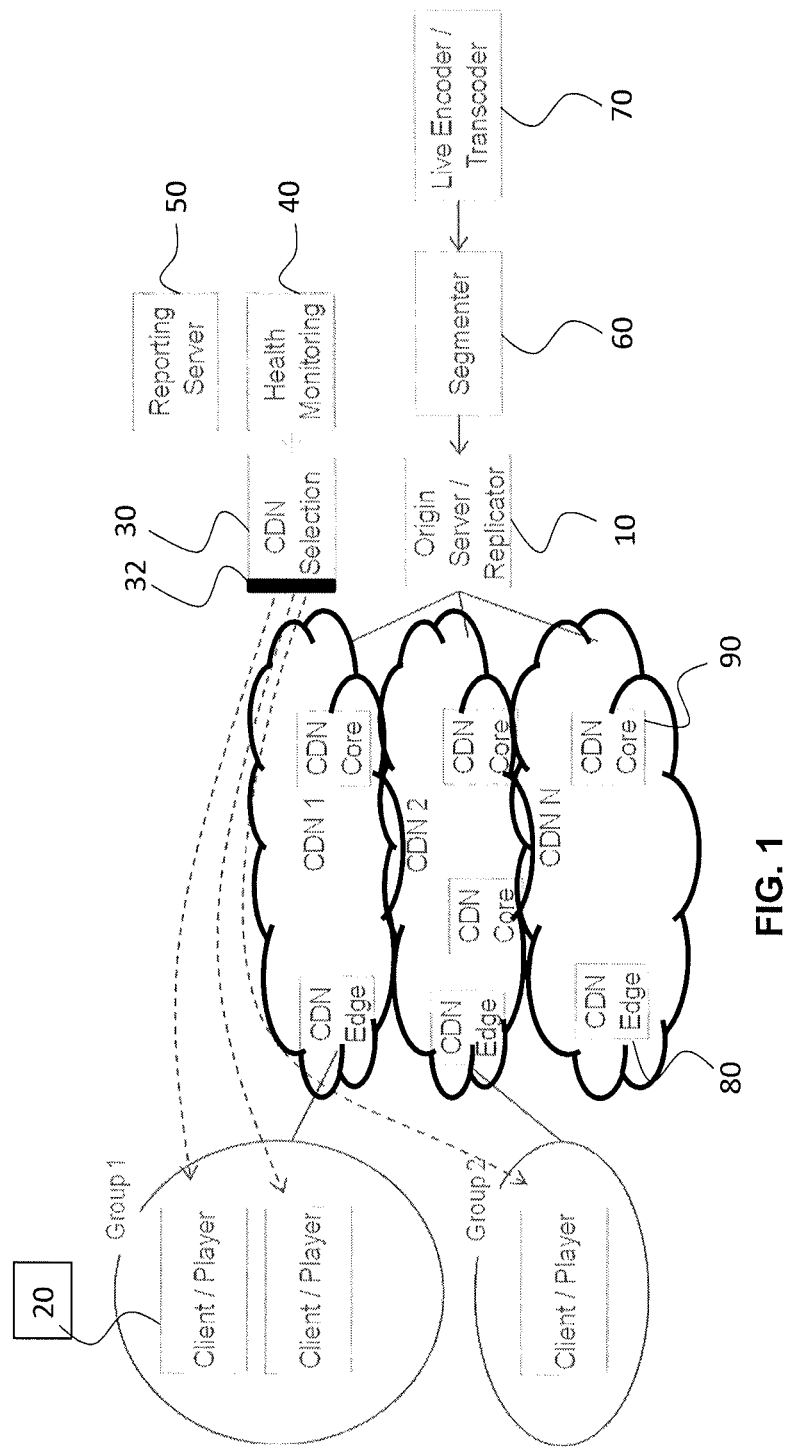
FIG. 1 is a schematic illustration of a network system embodiment according to the present disclosure.

FIG. 1 illustrates a network system according to an embodiment of the present disclosure. The network system comprises multiple CDNi (i=1 . . . N) located between an origin server 10 and multiple groups of client devices 20 (each with an associated media player). As shown in FIG. 1, client devices 20 belonging to Group 1 consume content through CDN1, client devices 20 belonging to Group 2 consume content through CDN2, and so on. The assignment between an individual client device 20 or an individual client device group on the one hand and an individual CDN is performed by a CDN entity selecting apparatus 30 that implements a CDN entity selection function. The CDN entity selecting apparatus 30 comprises an interface 32 to each client device 20.

As further shown in FIG. 1, the selecting apparatus 30 is coupled to a health monitoring apparatus 40, which in turn is coupled to a reporting server 50. In certain variants, at least one of the reporting server 50 and the health monitoring apparatus 40 is integrated into the selecting apparatus 30. Moreover, one or more of the selecting apparatus 30, the health monitoring apparatus 40 and the reporting server 50 may be located on a dedicated network node. The network node may be located within a content provider domain.

The content provider domain typically also includes the origin server 10, a segmenter 60 coupled to the origin server 10 as well as a live encoder/transcoder 70 coupled to the segmenter 60. The live encoder/transcoder 70 is configured to encode and/or transcode streaming content that will be segmented by the segmenter 60 into individual media segments. The media segments are output by the segmenter 60 to the origin server 10 which distributes the media segments via the CDNs to the client devices 20. The origin server 10 comprises a replicator configured to replicate the media segments towards the multiple CDNs.

As also shown in FIG. 1, each CDN comprises at least one CDN edge server 80 and at least one CDN core node 90. The CDN edge server 80 provides a content caching function. The CDN core nodes 90 are typically in charge of CDN internal content optimizations.

While not illustrated in FIG. 1, it will be appreciated that one or more access networks will be located between an individual client device 20 and an individual CDN edge server 80. Each access network may be configured to provide a wire-bound or wireless communication connection between a particular client device 20 and a particular CDN edge server 80.

Figure 2:
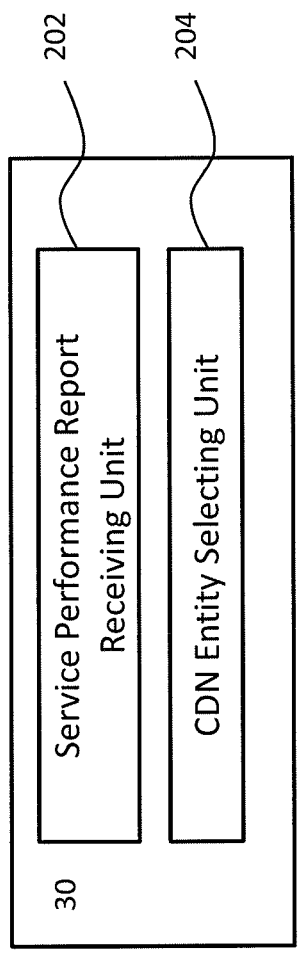
FIG. 2 is a block diagram of a selecting apparatus embodiment according to the present disclosure.

FIG. 2 illustrates a possible realization of the selecting apparatus 30. As illustrated in FIG. 2, the selecting apparatus 30 comprises a service performance report receiving unit 202 and a CDN entity selecting unit 204. The units 202 and 204 may each be realized in form of software, in the form of hardware, or as a combination thereof.

The service performance report receiving unit 202 is configured to receive service performance reports for multiple CDN entities of the set of CDN entities within the network system illustrated in FIG. 1. The service performance reports may, for example, be received from the client devices 20 or from any other network components.

The CDN entity selecting unit 204 is configured to select, upon determining from one or more of the received service performance reports that a service performance of a first CDN entity is above a first threshold, a second CDN entity for content distribution to a particular client device 20 subject to two or more constraints. The particular client device 20 may currently receive content from the first CDN entity. The one or more service performance reports underlying the selection may have been received from that particular client device 20.

The constraints evaluated by the CDN entity selection unit 204 comprise a first constraint according to which a service performance of the second CDN entity is below a second threshold. According to a further constraint, the service performance of the second CDN entity may be above a third threshold. According to a still further constraint, a resource consumption in regard of the second CDN entity is lower than a resource consumption in regard of the first CDN entity.

While not shown in FIG. 2, the selecting apparatus 30 may further comprise a triggering unit configured to trigger at least one action that causes the client device 20 to receive content from the second CDN entity selected by the CDN entity selecting unit 204.

Figure 3:
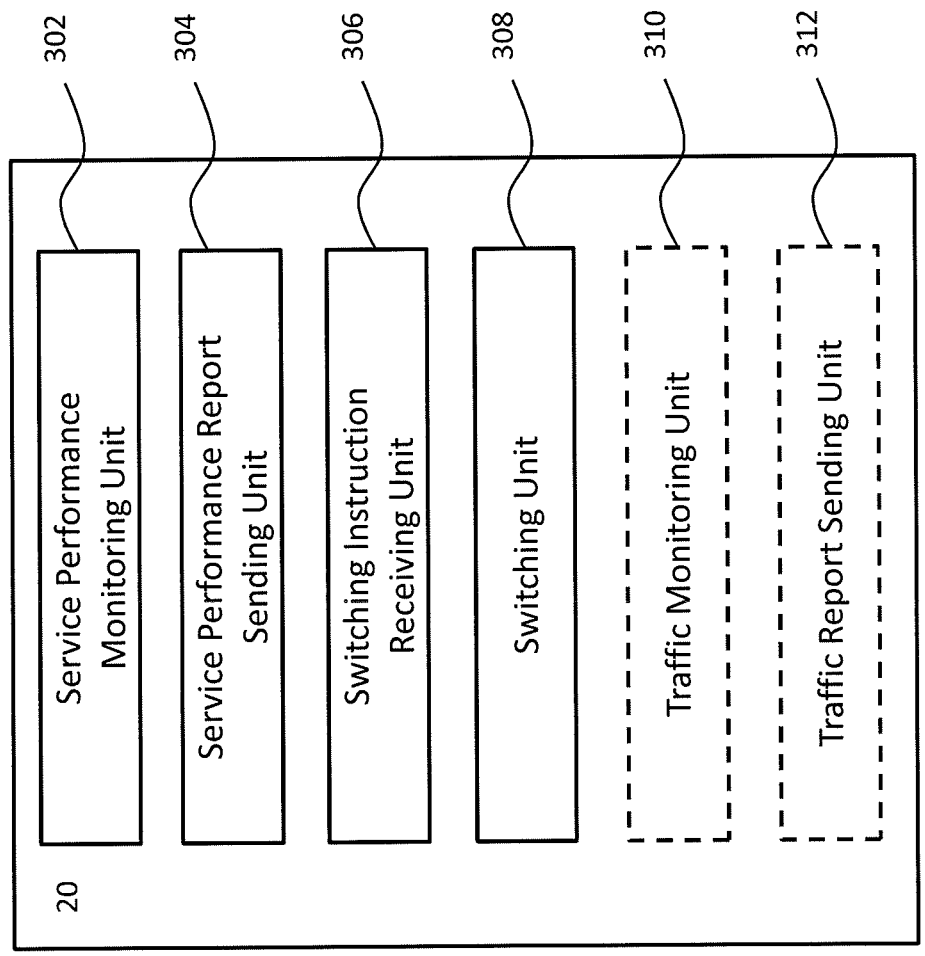
FIG. 3 is a block diagram of a client device embodiment according to the present disclosure.

FIG. 3 illustrates a possible realization of a client device 20 within the network system illustrated in FIG. 1. As shown in FIG. 3, the client device 20 comprises a service performance monitoring unit 302, a service performance report sending unit 304, a switching instruction receiving unit 306 and a switching unit 308. The individual units 302 to 308 may each be implemented in the form of software, in the form of hardware, or as a combination thereof.

The client device 20 is generally configured to switch from a first CDN entity to a second CDN entity for content reception. In this regard, the service performance monitoring unit 302 is configured to monitor service performance for the first CDN entity while receiving content therefrom. The service performance report sending unit 304 is configured to send a report regarding the service performance monitored for the first CDN entity by the service performance monitoring unit 302.

The switching instruction receiving unit 306 is configured to receive an instruction to switch to the second CDN entity. The instruction may have been received from the selecting apparatus 30 as indicated by dashed arrows in FIG. 1. The instruction is received by the client device 20 upon a service performance of the first CDN entity being above a first threshold, a service performance of the second CDN entity being below a second threshold, and a resource consumption in regard of the second CDN entity being lower than a resource consumption in regard of the first CDN entity.

The switching unit 308 is configured to switch to the second CDN entity responsive to receipt of the instruction by the switching instruction receiving unit 306. After the switch has been performed, the service performance monitoring unit 302 may continue monitoring service performance for the second CDN entity while receiving content therefrom, the service performance report sending unit 304 may send a report regarding the service performance monitored for the second CDN entity, and so on.

As also illustrated in FIG. 3, the client device 20 may further comprise an optional traffic monitoring unit 310 configured to monitor a traffic volume of content received from at least one of the first and the second CDN entity. Additionally, an optional traffic report sending unit 312 may be provided that is configured to send a report regarding the monitored traffic volume. The report may be sent to the reporting server 50 or directly to the selecting apparatus 30 within the network system illustrated in FIG. 1.

Figure 4:
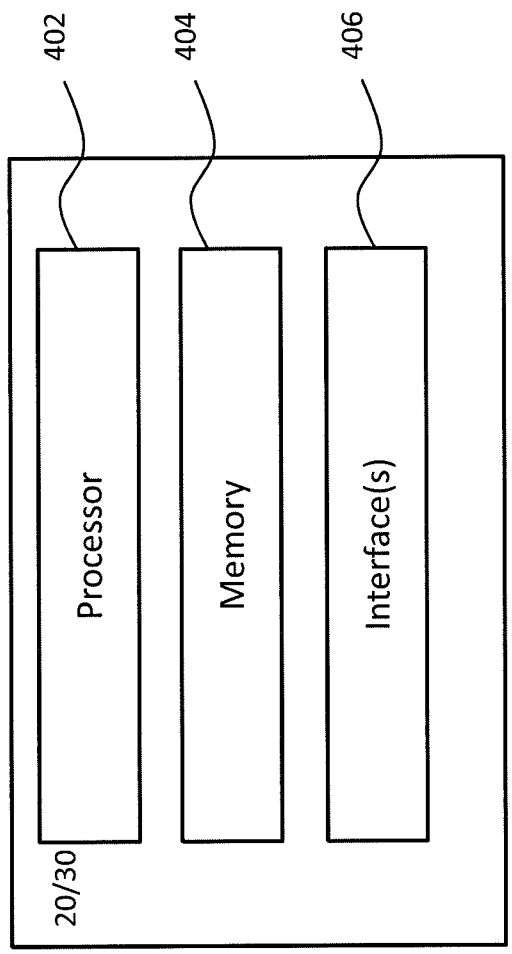
FIG. 4 is a block diagram of an alternative realization of a selecting apparatus embodiment or client device embodiment.

FIG. 4 illustrates an alternative configuration of either one of a particular client device 20 and the selecting apparatus 30. As illustrated in FIG. 4, the respective component 20/30 comprises a processor 402, a memory 404 and one or more interfaces 406. The memory 404 comprises program code that causes the processor 402 to realize the functions described above with respect to the units illustrated in FIGS. 2 and 3, as well as other functions described herein.

In the case of the client device 20, the one or more interfaces 406 may comprise an access network interface as well as an interface to the selecting apparatus 30 and, optionally, to the reporting server 50. In the case of the selecting apparatus 30, the one or more interfaces 406 may comprise an interface to the client devices 20 (see reference numeral 32 in FIG. 1) as well as one or more optional interfaces to the origin server 10, the health monitoring apparatus 40 and the reporting server 50.

Figure 5:
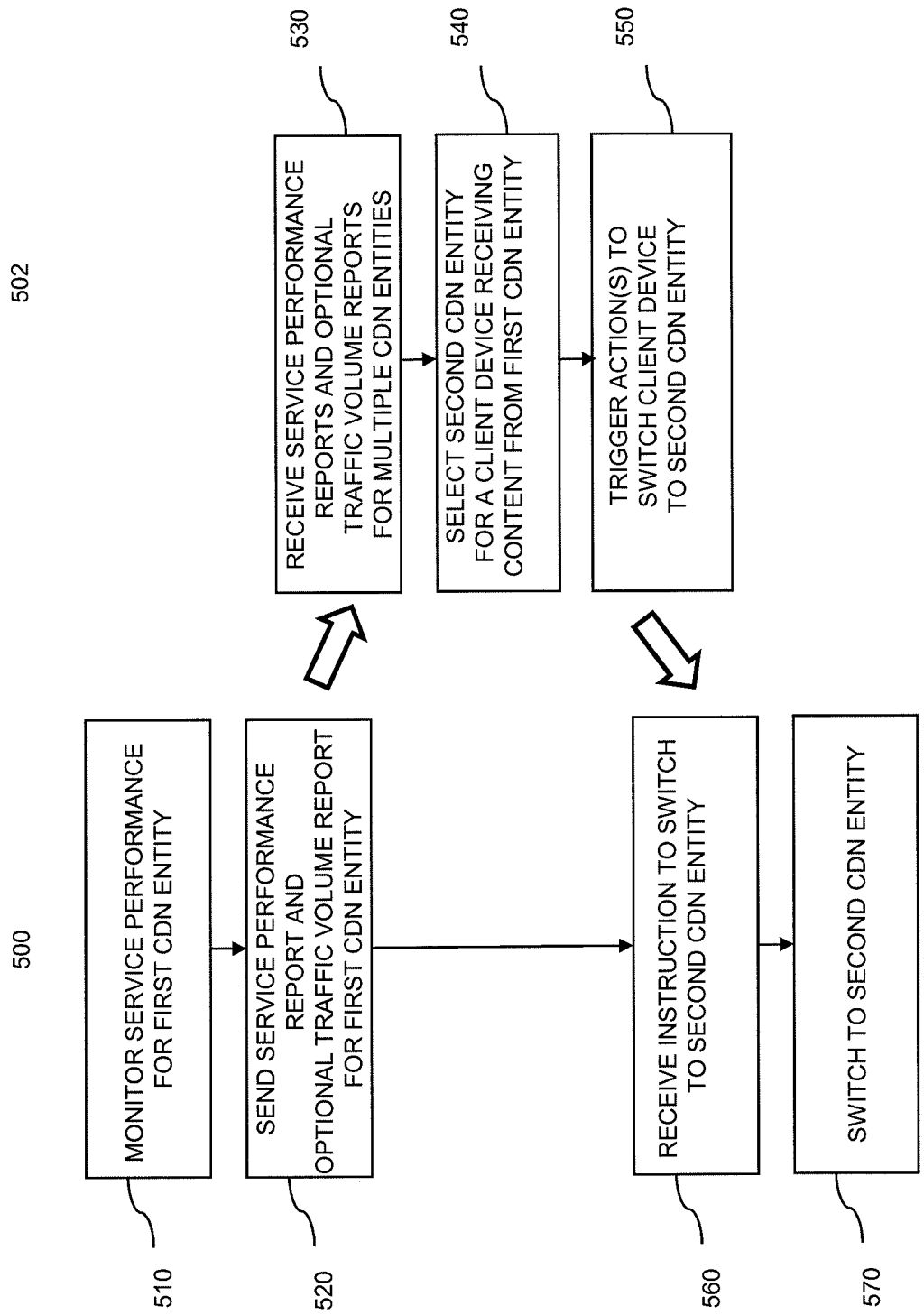
FIG. 5 is a flow diagram of method embodiments according to the present disclosure.

FIG. 5 illustrates two flow diagrams 500, 502 that are representative of method embodiments performed by one of the client devices 20 and the selecting apparatus 30, respectively. The individual steps, functions and services illustrated in FIG. 5 may be performed by the respective units illustrated in FIGS. 2 and 3 or the components illustrated in FIG. 4.

The operation illustrated in FIG. 5 is based on one of the client devices 20 illustrated in FIG. 1 receiving content from a first CDN entity, such as CDN1 in FIG. 1.

In a first step 510, the client device 20 monitors service performance for that first CDN entity. As will be explained in greater detail below, distribution delay or media rendering quality may be monitored to this end.

In a further step 520, the client device 20 sends a service performance report for the monitored first CDN entity to the selecting apparatus 30 (or, alternatively, to the reporting server 50). The service performance report may include an indication of the first CDN entity, such as an identifier of the first CDN entity. Service performance reports may be sent in step 520 in predefined intervals or upon receipt of specific report requests. It will be appreciated that service performance reports for the first and other CDN entities will also be sent by other client devices 20 within the network system of FIG. 1.

As also illustrated in FIG. 5, the operations performed by the client device 20 may further comprise monitoring a traffic volume of content received from, from example, the first CDN entity while being attached thereto. The monitoring operation may be implemented by the traffic monitoring unit 310 illustrated in FIG. 3. The client device 20 may further send a report regarding the monitored traffic volume (optionally together with an indication of the first CDN entity, such as an identifier of the first CDN entity) to the selecting apparatus 30 or to the reporting server 50 (which will, in turn, communicate with the selecting apparatus 30). The traffic volume report may, for example, be sent by the traffic report sending unit 312 illustrated in FIG. 3 and together with the service performance report in step 520, or separately therefrom.

In step 530, the selecting apparatus 30 receives multiple performance reports for multiple CDN entities from multiple client devices 20 (or, alternatively, from the reporting server 50, which could also be integrated into the selecting apparatus 30). Moreover, in step 530 also one or more of the optional traffic volume reports may be received.

In a further step 540, the selecting apparatus 30 selects a second CDN entity for content distribution to one or more of the client devices 20. Step 540 may specifically be performed upon (e.g. triggered by) determining from one or more of the service performance reports received in step 530 that a service performance of the first CDN entity is above a first threshold. This means that the selecting apparatus may determine that the service performance of the first CDN entity is better than actually required (e.g., in view of the media rendering capabilities of a particular client device 20).

Step 540 may in particular be performed in regard of an individual, pre-selected client device 20. As an example, step 540 may be performed in a round-robin session for each client device within Group 1 and Group 2 illustrated in FIG. 1.

In step 540, the second CDN entity is selected for content distribution to the particular client device 20 subject to the constraints that a service performance of the second CDN entity is below a second threshold and that a resource consumption in regard of the second CDN entity is lower than a resource consumption in regard of the first CDN entity. The service performance of the second CDN entity may be evaluated based on the service performance reports received in step 530 for the second CDN entity. As explained above, the reports may each contain an identification of the particular CDN entity for which the service performance and/or traffic volume are/is reported.

The first constraint takes into account that the service performance provided by the first CDN entity is actually better than needed, while the second CDN entity still provides a sufficiently high service performance (that may be lower than the service performance provided by the first CDN entity). As such, the second threshold may equal or may be below the first threshold in regard of a particular service performance metric, where it is assumed that a higher service performance metric is associated with a higher (i.e., better) service performance.

The second constraint ensures that switching the particular client device 20 from the first CDN entity to the second CDN entity will reduce the overall resource consumption. The overall resource consumption may thus be reduced. The resource consumption may be reduced from the perspective of an individual CDN or CDN entity (e.g., in regard of the first CDN entity in the present example) and/or from the perspective of the content provider (e.g., because using the first CDN entity is more expensive due, for example, to the use of more sophisticated infrastructure or technologies).

It should be noted that the resource consumption may in certain embodiments be determined based on the optional traffic volume reports received in step 530. For example, the resource consumption for a particular CDN entity may be calculated based on the aggregated traffic volume as derived from a plurality of traffic volume reports received from a plurality of client devices 20 for that particular CDN entity (e.g., during a specific period of time, wherein the traffic volume reports may contain indications of the reported time spans).

As such, the total traffic volume (i.e., traffic load) caused by the client devices 20 serviced by a particular content provider may be derived (assuming that the selection apparatus 30 or other component performing the aggregation is located in the domain of that content provider). Of course, it would also be possible to perform the aggregation among all client devices 20 serviced by a particular CDN entity (e.g., a particular CDN) to determine a total traffic load of that particular CDN entity (e.g., in regard of a particular content provisioning service).

In one embodiment, the resource consumption is determined from the aggregated traffic volume and a traffic volume cost indication (e.g., in terms of a monetary value per traffic volume unit such as ct/GByte or in terms of a more complex, non-linear function). The traffic volume cost indication per CDN may have been received from the respective CDN domain (e.g., the CDN provider). By reducing or minimizing the corresponding resource consumption as a result of the CDN entity selection in step 540, not only the traffic load on the more sophisticated (and thus more expensive) CDN entities can be reduced, but also the CDN provider will benefit as financial resources are reduced or minimized also.

In a further step 550, that may be optional, the selecting apparatus 30 triggers actions to switch the particular client device 20 from the first CDN entity to the second CDN entity. Such actions may comprise indicating the second CDN entity in a manifest file and triggering transmission of the manifest file that indicates the second CDN entity to the particular client device 20.

In step 560, the particular client device 20 will receive the manifest file or any other instruction switched to the second CDN entity. Then, in step 570, the client device 20 executes the instruction and switches to the second CDN entity. The whole procedure may then start again from step 510 with the client device 20 monitoring service performance for the second CDN entity.

At the selecting apparatus 30 or the reporting server 50, the reported traffic volumes may be aggregated (e.g., per CDN entity). Further, a resource consumption may be calculated for each CDN entity based on the reported traffic volumes aggregated for that CDN entity and a traffic volume cost indication for that CDN entity (e.g., a monitory value per predefined data volume).

Within the scope of this disclosure, content can be delivered to the client devices 20 using various content delivery protocols. The Hypertext Transfer Protocol (HTTP) has become the dominant protocol for content delivery, mostly because it allows building scalable and efficient CDNs with common off the shelf components. In HTTP streaming, media segments constituting the content to be distributed are transmitted from the origin server 10 operated by the content provider to the CDN edge servers 80 illustrated in FIG. 1. HTTP streaming can occur in an adaptive or non-adaptive manner.

The media players on the client devices 20 typically support HTTP Live Streaming (HLS), Dynamic Adaptive Streaming over HTTP (DASH) or HTTP Dynamic Streaming (HDS) formats for content consumption. In case non-HTTP media delivery is used between the content provider system and the client devices 20 (e.g., Octoshape, QUIC, etc.), an HTTP proxy or server may be deployed (e.g., locally on the client device 20). This approach enables to use native/standard HTTP media players, including all auxiliary features such as Digital Rights Management (DRM) or sub-title support.

In addition to content distribution, the CDN core nodes 90 often perform internal optimizations (e.g., format conversion, trans-muxing, etc.) inside their CDNs to the content that is to be delivered. Some HTTP-based CDNs (e.g., Octoshape) apply forward error correction to add robustness to the media segments. The CDN internal operations might result in modifying the delivered segment (e.g., in terms of segment number or segment order). Media segments of a MPEG DASH or HLS streaming session may be stored inside the CDN before making the segments available on the CDN edge servers 80. CDN internal trans-muxing procedures (e.g., the conversion of TS segments into ISO-BMFF segments) also take some time.

The distribution of media segments to the edge servers 80 and the CDN internal optimizations thus affect the service performance such as the end-to-end (e2e) delay from the perspective of the client devices 20. The e2e delay may further depend on the location and the current load of the serving edge server 80.

Several approaches have been proposed to validate the integrity of adaptive HTTP content. In one example, the edge servers 80 generate secure identifiers and hash keys, which are provided to the peers for HTTP streaming in peer-assisted CDNs. In another example, the integrity of an HTTP segment is verified using a digest or digital signature. All these approaches, however, do not consider or provide mechanisms for measuring e2e distribution delay for an adaptive HTTP streaming service.

On the other hand, the 3GPP DASH specification TS 26.247 defines Quality of Experience (QoE) metrics for reporting between a client device 20 and the origin server 10. Among these metrics, the HTTP request/response transactions allow a client device 20 to report the time an HTTP request was made by the client device 20 to the server 10 and the time when the first byte of the HTTP response was received at the client device 20 (in wall clock time). The HTTP request/response metric would allow the server 10 to calculate fetch durations for media segments which can, for instance, be used to detect malfunctions in the serving CDN. The metric, however, does not measure the e2e distribution delay since it does not consider the time when a media segment was made available at the server 10.

The present disclosure generally targets at optimizing (e.g., minimizing) the traffic volume or, more generally, the resource consumption of a content offering, while still maintaining a predefined service performance such as distribution delay. Service performance targets (e.g., an upper or lower threshold) or target ranges can be defined for distribution delay, media rendering quality (e.g., service visual quality), or any combination of the two. Of course, other service performance metrics may be applicable as well.

In case of e2e distribution delay for instance, many end-users prefer having a distribution delay of, for example, 10 sec in case of live sports events. But the perceived content rendering quality does not increase significantly anymore when bringing the delay from 3 sec to 1 sec. Thus, a service performance target range can be defined in case of distribution delay.

Similarly, a service performance target range can also be defined in regard of audio or visual quality. As an example, end-users regard service performance in terms of video quality on a 4" smartphone screen as "good" when a video coding bitrate of ~1.5 Mbps is used (for Advanced Video Coding, or AVC). On the other hand, service performance is regarded to be bad when a bitrate of 1 Mbps or less is offered. However, end-users do not recognize a service performance difference on a typical smartphone screen when the coding bitrate is beyond 2 Mbps. Similar considerations apply to audio coding bitrates.

Generally, the limiting factor in regard of service performance can vary. In many cases, the actual access network interfacing a particular CDN is limiting the performance. In some cases, the actual CDN (e.g., the CDN infrastructure behind the access network) is limiting the performance. CDNs and CDN access networks are in the following jointly denoted as CDN entities. A CDN entity may be represented by a CDN identifier (for an individual CDN) or a tuple comprising a CDN identifier and an access network type (for a combination of CDN and access network type).

When the CDN access network is limiting the performance, then a CDN entity selection strategy (e.g., within the domain of the content provider) may not need to select a technically sophisticated (and thus potentially expensive) CDN. Using a less sophisticated (and potentially cheaper) CDN may reach the same service performance from the perspective of the end-user who consumes the content.

In order to optimize CDN entity selection, the CDN entity selection strategy implemented by the selecting apparatus 30 may consider one or more of the following aspects:

1) Have the traffic volume through different CDN entities continuously monitored (or estimated) and, if performed remotely by the client devices 20, reported. Calculate and/or aggregate transmission volumes (and possibly the traffic costs associated therewith as different CDN entities may have different traffic volume costs).
2) Have the service performance through different CDN entities continuously monitored and, if performed remotely by the client devices 20, reported. This aspect may be needed to select, for example, an alternative CDN access network for a particular CDN. When the QoE system can derive more granular connectivity information (e.g., HSPA vs. LTE access), then CDN entity selection separates the received reports per more-detailed-access-system type.
3) Actively steers to client devices 20 to one or more alternative CDN entities when the service performance is either too good or too bad (and, optionally, when resource consumption can be reduced by selecting the one or more alternative CDN entities).

In one implementation, the CDN entity selection approach implemented by the selecting apparatus 30 collects performance metrics (e.g., delay, quality, etc.) and optional traffic information for content (e.g., video or other media) and determines a CDN entity that reduces or minimizes the resource consumption (e.g., in terms of load or cost) while ensuring that the service performance satisfies one or more predefined criteria (e.g., is within a specified target range bound by an upper and a lower threshold as explained above). The CDN entity selection considers both the actual resource consumption and the actual service performance. Depending on performance metrics, the selection implemented by the selecting apparatus 30 assigns a client device 20 to a "second"-best CDN. That is, the client device 20 is allocated to a nominally non-optimal CDN if the performance is still good enough and the resource consumption can be reduced.

In some cases, CDN entity selection considers the N different CDNs as exemplarily illustrated in FIG. 1, filters the CDNs that fulfill one or more service performance criteria (e.g., are within a certain performance target range) and then selects among the filtered CDNs the one with the minimal resource consumption and assigns it to a particular client device 20.

In some examples, the client devices 20 report media performance metrics such as one or both of distribution delay and media rendering quality. Each client device 20 may additionally report a traffic volume metric that indicates the amount of downloaded content (e.g., video) at the client device 20. CDN entity selection may then use the reported traffic volume to automatically calculate the actual resource consumption (e.g., in terms of load or costs) for different CDNs or CDN/access network combinations.

Such a CDN entity selection allows a content provider to minimize the service offering cost while providing a certain service quality (CDN providers typically only charge for traffic volume leaving their CDN). When CDN servers 80 or core nodes 90 of a particular CDN are located at a "good"

topology point with a high throughput between CDN entity and content consuming client device 20, then the service performance is high. When the service performance is higher than actually needed for a sufficiently good content offering (e.g., a 5 Mbps video can be rendered on a 4" smartphone screen), then CDN selection can redirect the client device 20 to an alternative CDN entity having a lower overhead (in terms of traffic costs or in terms of current traffic load), but a still sufficiently good quality.

With increasing usage of virtualization in the e2e delivery chain, service performance (e.g., in terms of delay and video or audio quality) is more and more influenced by other concurrent processes. It would thus be desirable for content providers to monitor the e2e segment delivery delay and media rendering quality to determine whether an agreed service level agreement is kept.

CDN entity selection as implemented by the selecting apparatus 30 or—at least partially—in alternative components may in some embodiments include three main functions: a performance monitoring function, a traffic monitoring function, and an resource-optimized CDN entity selection function.

The performance monitoring function continuously collects feedback from the client devices 20 on streaming bitrates, distribution delay or other performance metrics. An approach for distribution delay measurement is explained in Sect. 1 below. The traffic monitoring function calculates (or estimates) the consumed traffic volume per CDN. The traffic volume can be reported by the client devices (e.g., each client device 20 reports its consumed traffic volume). A corresponding metric reporting approach is described in Sect. 3 below. The objective of the resource consumption-optimized CDN selection function is to minimize the resource consumption subject to a service performance constraint (e.g. in terms of media rendering quality, e2e delay or a combination thereof). Exemplary algorithmic approaches for resource consumption-optimized CDN entity selection will be explained in Sects. 4 and 5 below in greater detail.

1. Distribution Delay Measurement and CDN Entity Selection

Figure 6:
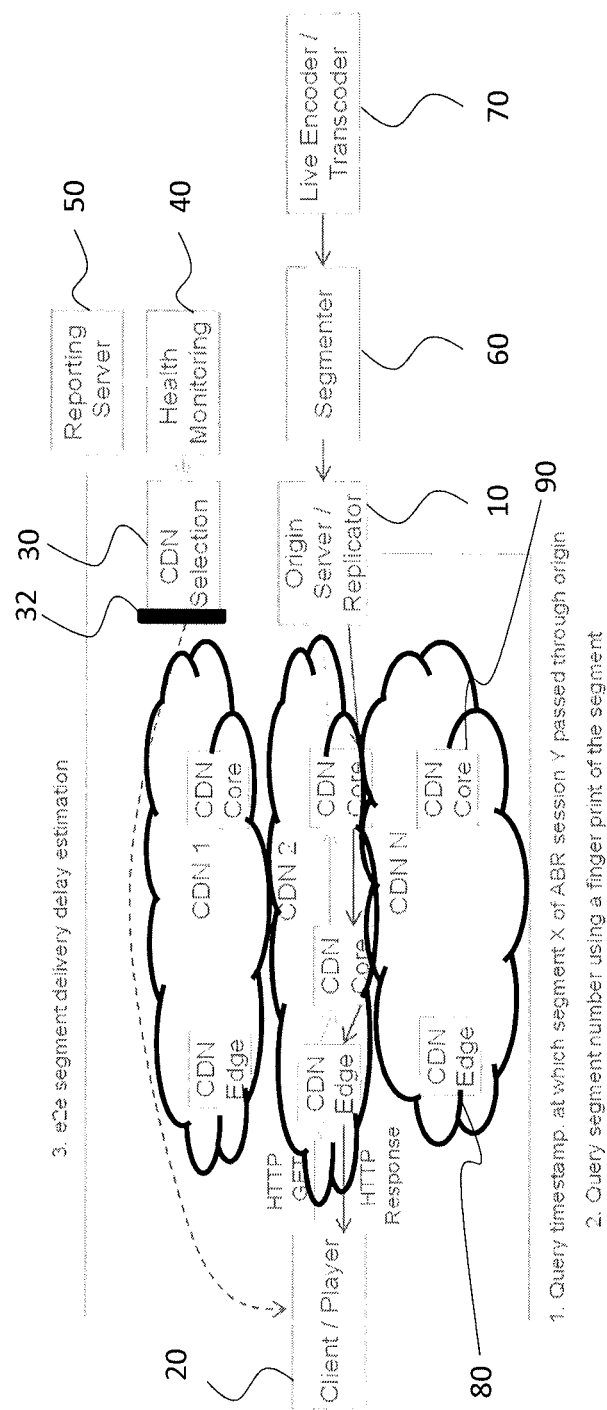
FIG. 6 is a schematic diagram of a distribution delay estimation embodiment according to the present disclosure.

FIG. 6 shows the end-to-end architecture for ABR streaming over a CDN in the network system discussed above with reference to FIG. 1.

The output of live encoder/transcoder 70 is fed to the media segmenter 60. The segmenter 60 generates ABR segments (having typically a 2 to 10 sec duration). The segments are pushed to the origin server 10 having an optional replicator to replicate the segments in regard of the various CDN edge servers 80 for caching purposes. The origin server 10 also stores the segments for time-shifted consumption.

As explained above, the origin server 10 is connected to N (N>=2) CDNs, each configured to deliver media content to the client devices 20. The CDN entity selection function of the selection apparatus 30 in the domain of the content provider selects the CDN entities to serve the client devices 20 based on health statistics and/or other current performance characteristics of the different CDNs. In this respect, the CDN selection function continuously monitors the connectivity between the origin server 10 and the client devices 20 to ensure that the serving CDN entity meets the expectations of the content provider.

Each CDN node 80, 90 may write the content onto local storage for caching purpose. The service performance of CDN nodes 80, 90 depends on the concurrent load on the node and on the connecting links (e.g., the access networks towards the client devices 20). As such, the CDN service performance will also depend on the actual location (in terms of Point of Presence, or PoP) of a client device 20 in the network topology.

The selection function informs each client device 20 about the preferred CDN. To this end, the selection function may rewrite a manifest file with metadata required for media rendering (to generate a "personalized" manifest file for a particular client device 20) or may use other means to influence the client device 20 so as to trigger a (re-)selection. For instance, the manifest file may contain multiple base URLs and the selection function may just "tell" (using, e.g., out of band signaling) the media player on the client device 20 (directly or through a controlling app) which base URL to use for content fetching. Using a particular base URL, the media player requests the segments from a particular CDN edge server 80 using an HTTP Get request. The CDN edge server 80 fetches the segment from the origin server 10 (or from a local cache) and delivers the fetched segment to the client device 20.

In one variant the selection function steers a minority of media players/client devices 20 through some or all alternative CDNs in order to also acquire service performance input of the other available CDNs in the content offering.

In order to measure the e2e distribution delays, the client devices 20 may query a timestamp at which a particular segment passed through the origin server 10. To this end, the origin server 10 (or the segmenter 60) may provide an Application Programming Interface (API) for the client devices 20 to query the timestamp for a given segment. To validate the integrity of the received segment, the client devices 20 can query the segment number using a fingerprint of the segment. The client device 20 may then determine the e2e distribution delay by comparing the retrieved timestamp with the time at which the first part of the given segment was received a client device 20.

The client devices 20 may provide the e2e distribution delay estimate to the reporting server 50 or to the selection function on the selecting apparatus 30. Alternatively, the client device may also report only the timestamps to enable a determination of the e2e distribution delay by any of these components.

The reported e2e distribution delay information may be fed alongside other CDN- and client device-related information (e.g., CDN utilization, media quality at the client, etc.) to the health monitoring apparatus 40 (or generally a CDN entity performance determination function). The information from the health monitoring is considered by the selection function to select and decide to switch to a different CDN entity when needed for client devices 30 in a certain part of the network (i.e., topology-wise).

Figure 7:
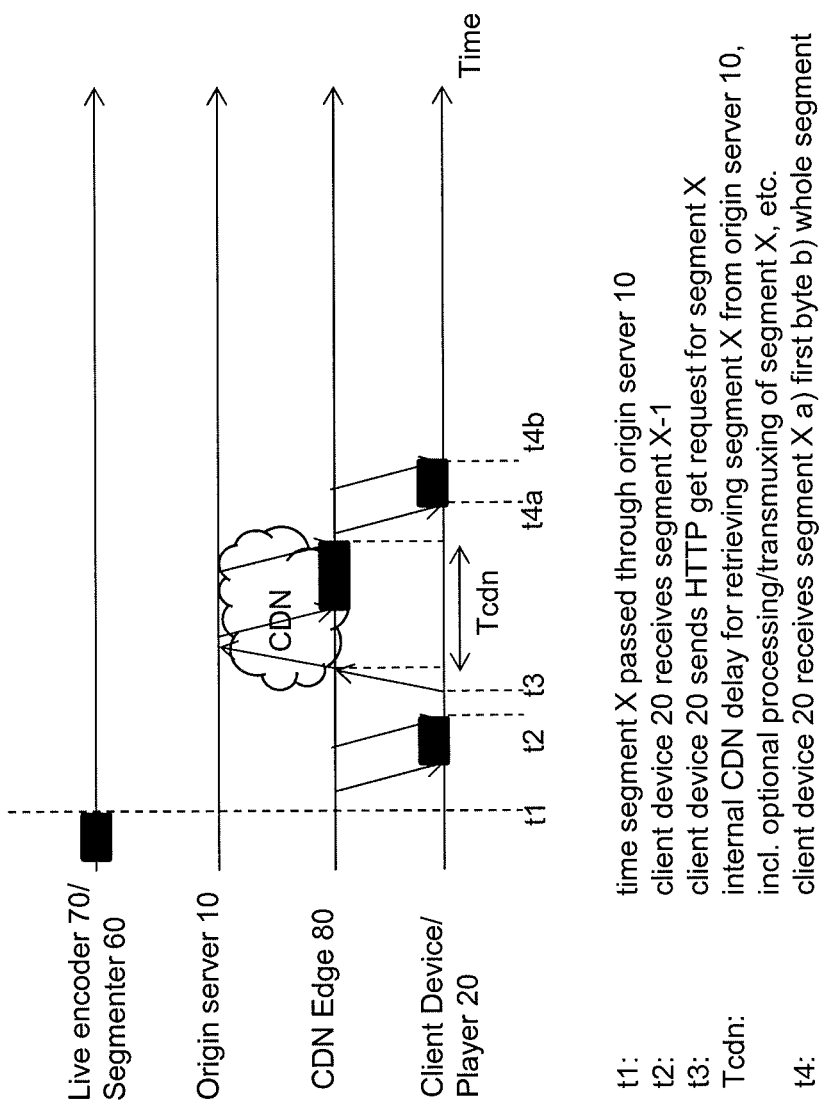
FIG. 7 is a schematic diagram illustrating a distribution delay determination embodiment according to the present disclosure.

FIG. 7 shows a breakdown of the e2e distribution delay components between the origin server 10 and a particular client device 20 (node internal processing delays are not depicted).

As shown in FIG. 7, the origin server 10 logs a timestamp t1 when Segment X passes through the origin server 10 (i.e., the time, at which a certain segment such as Segment X is available on the origin server 10). The media player on the client device 20 or the client device 20 as such requests Segment X at time instant t3 from a CDN edge server 80. The edge server 80 either fetches the segment from the origin server 10 or delivers the segment directly to the client device 20 if it is available in its cache. The CDN can apply additional optimizations to the segment (e.g., trans-muxing, adding FEC protection, etc.) before it delivers the segment to the client device 20, which add delay. The CDN might start transmitting the segment to the client device 20 before receiving the full segment at the edge (progressive reception) or after the segment is fully received (store-and-forward). The CDN internal processing delay is denoted by Tcdn.

At time instants t4a and t4b, the client device 20 receives the first byte of the segment and the full segment, respectively. The client device 20 then estimates the e2e distribution delay (i.e., t4a-t1 or t4b-t1) and reports the delay estimate to the reporting server 50 or directly to the selection function.

Figure 8:
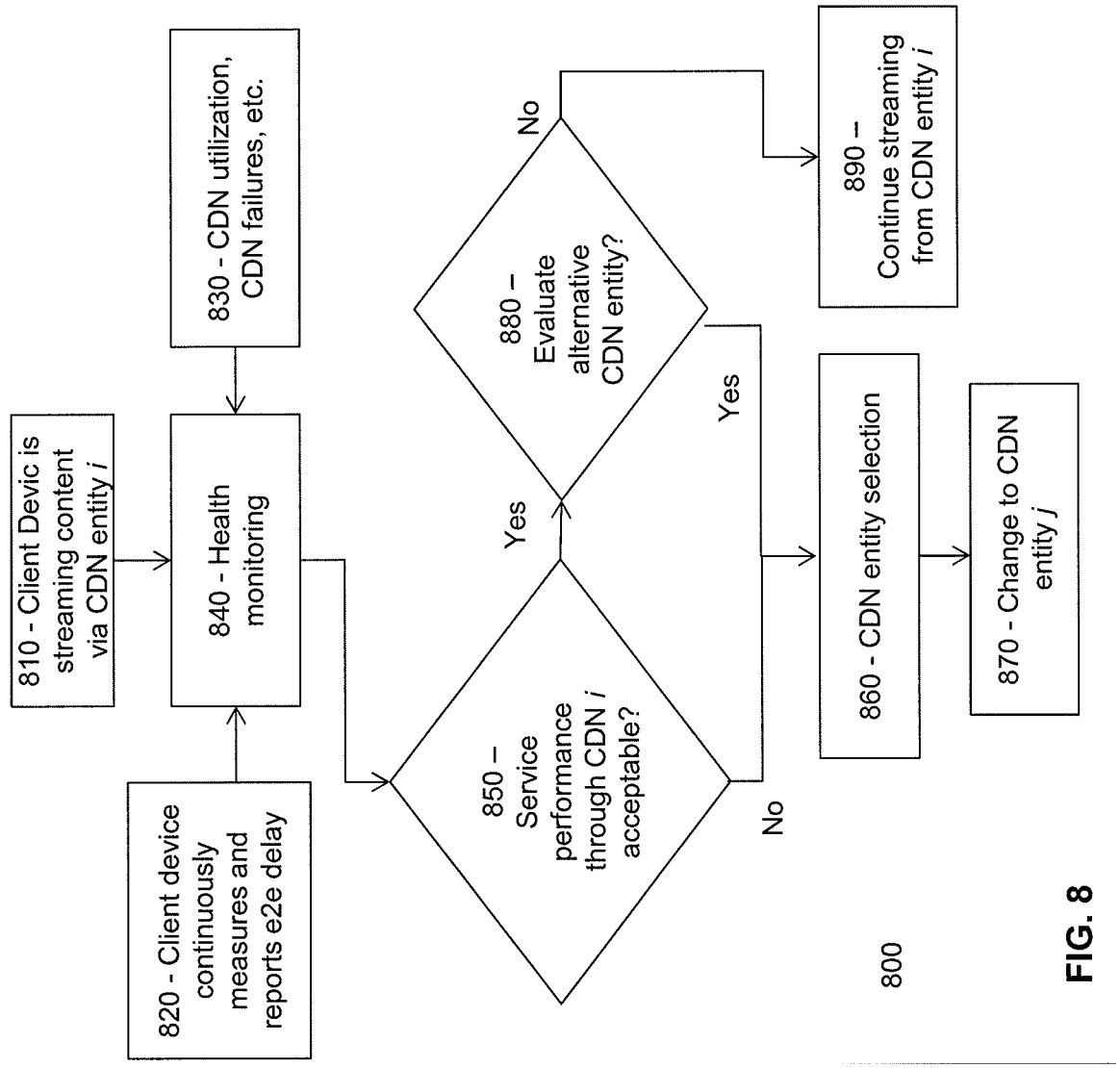
FIG. 8 is a block diagram of a further method embodiment according to the present disclosure.

FIG. 8 shows a flow chart 800 representative of CDN entity switching approach based on the distribution delay reported by a client device 20. Dynamic CDN switching is considered here based on continuous/frequent monitoring of the distribution delay during a streaming session. Without loss of generality, the same concept can be used for initially selecting a serving CDN entity for a particular client device 20.

Assume a client device 20 is connected and streaming video from CDN entity I (step 810). As explained above, CDN entity i may either be a particular CDN access network type for a particular CDN or the particular CDN as such (i.e., the CDN infrastructure behind the access network, including for example one or more CDN core nodes 90) or a combination thereof.

The health monitoring function (step 840) is receiving continuous (at least with a certain frequency) distribution delay feedback from the client device 20 (step 820) alongside other health information about the currently serving CDN entity i (step 830). When CDN entity i offers an interface, CDN entity i may for example give input on CDN load or CDN failures conditions to the health monitoring function. If it is found in step 850 that the service through CDN entity i is no longer acceptable (i.e., another CDN entity shows a better performance) the CDN entity selection function is called (step 860), which checks if a better serving CDN entity j is available. In this case, the client device 20 will be informed accordingly and starts streaming from the new CDN entity j in step 870. If the procedure decides that no alternative CDN entity is to be measured (step 880), the procedure permits the client device 20 to continue streaming from CDN entity i (step 890).

The procedure may randomly (or based on an alternative strategy) instruct client devices 20 to utilize an alternative CDN entity for content consumption (step 880). This may typically happen at the start of a new session. The intention is that the selection function needs to get service performance information from alternative CDN entities. As such, all available CDN entities should be used for content delivery, but the majority of traffic volume should go through the best performing CDNs and only a minority of traffic volume should go through the worst performing CDNs.

2. Procedures for CDN Entity Selection Based on Measured Distribution Delay

In the following, exemplary procedures of the CDN entity selection approach are explained in more detail. One of the objectives is to enable media synchronization among the client devices 20 and/or ensure that the delay experienced by the client devices 20 fulfills one or more criteria (e.g., is within a pre-defined target range) while minimizing or at least reducing resource consumption.

Specifically, the knowledge about the e2e distribution delay or other service performance metrics allows the selection function to determine the appropriate mechanism for synchronizing the media playout among different client devices 20 and different distribution paths. In the following, different possible procedures are listed that may be implemented individually or jointly. In Sect. 4 below, the algorithmic details will then be described.

1) The selection function assigns the client devices 20 to distribution paths (in terms of different CDN entities) that guarantee a quality of service/experience constraint (i.e., in terms of e2e distribution delay) while ensuring that paths which reduce resource consumption for a content provider and/or CDN provider are selected.
2) There is a lag to the live moment at the client device 20, and the selection function allows the client device 20 to get closer to the live edge. This includes the possibility to optimize the transmission for the client device 20 by selecting an alternative CDN entity which provides a lower distribution delay.
3) The CDN entity selection function is simultaneously synchronizing the media playout for multiple client devices 20. Given the input on the distribution delay for the different client devices 20 and, optionally, the health statistics (e.g., load, available throughput, etc.) of the different distribution paths, the selection function attempts to synchronize the media delivery to different clients devices 20. This might, for instance, result in synchronizing the client devices 20 to a point with the objective that all client devices 20 are experiencing similar distribution delays. Such optimization is not possible in a single client optimization system as it requires knowledge of the distribution delays for different client devices 20 and different distribution paths.
4) The selection function synchronizes the transmission of different content on different paths. This requires knowledge of the distribution delay for different content. A content provider can decide how to make supplementary content available (e.g., ads) by utilizing the delay information (e.g., decide to either use unicast or multicast transmission).

3. Traffic Volume Reporting Metric

The consumed traffic volume per CDN, per CDN access network type or per combination thereof (i.e., per CDN entity) can be reported directly by the client devices 20. In one variant, each client device 20 calculates out of the requested bitrates the consumed traffic volume and reports to the traffic monitoring function of the selecting apparatus 30. Alternatively, the client device 20 captures the segment size (in byte) of the downloaded segments. Different from the reported bitrate, this metric allows a more accurate representation of the consumed traffic per CDN entity at each client device 20, as it accounts for all the data received by the client device 20 over this CDN entity. In particular when the client device 20 replaces low-quality portions of the stream with higher quality portions, the actually downloaded volume can be higher.

Figure 9:
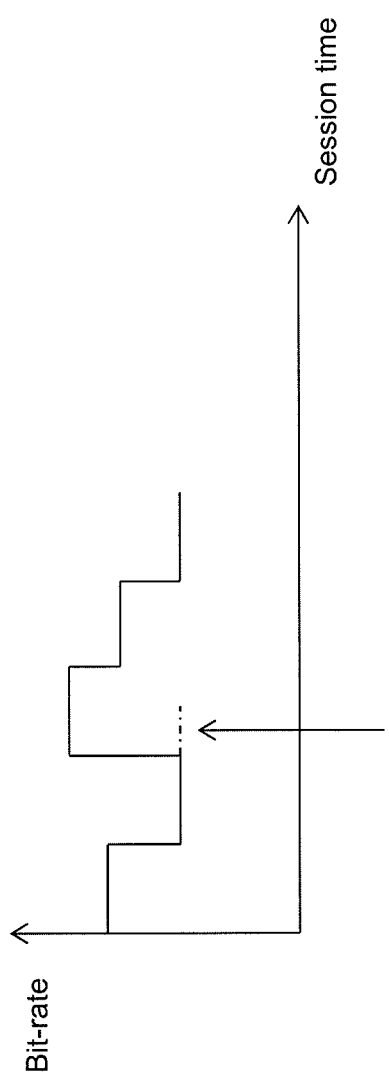
FIG. 9 is a schematic diagram illustrating a bitrate variation scenario.

This situation is further explained in FIG. 9, where a client device 20 terminates a download of a certain representation (for instance due to changes in buffer level) and starts requesting the same segment at a different representation bitrate. When calculating the aggregate traffic volume at the client device 20, the terminated segment download size is also considered.

The traffic volume at the client device 20 is calculated as the sum of received data (e.g., in bytes) over a unit of time (e.g., session time or reporting period). The volume for client device i can be expressed as $$V_i = \Sigma_t R_i \cdot t_i,$$

where $R_i$ is the representation bitrate, $t_i$ is the downloaded segment duration, and the integral sum is over the session time or reporting period.

4. Algorithm for Cost Efficient CDN Entity Selection Subject to Distribution Delay Constraint In the following, an approach is described for utilizing the distribution delay measurements to select the CDN distribution paths for the client devices 20. The objective is to fulfill the constraints that the distribution delays at the client devices 20 are each within a pre-defined target range while considering the resource consumption:

Let M be the number of client devices 20 receiving, for example, ABR content from the content provider Let $M_t \ll M$ be the number of client devices 20 to be used for testing alternative CDN entities Let $d_i$ be the e2e distribution delay reported by client device 20, where i=1 ... M ....

Let N be the number of available distribution paths (i.e., CDN entities)

The number of client devices 20 to be allocated to "non-preferred" CDN entities should be small compared to the total number of client devices 20. The corresponding "probe" clients should be fairly distributed across the client devices 30 in a region so that no client device 30 experiences a bad performance for a long time. For instance the client devices 20 can be selected in a round robin way. $B(M_t)$ denotes the group of client devices 20 that is allocated to "non-preferable" CDN entities.

The distribution delay is used as a key metric for selecting a distribution path (i.e., the CDN entity). An exemplary approach will be described for ABR client devices 20 that can belong to the same or different priority classes. The expected e2e distribution delay a client device 20 should experience can be defined with an upper and lower threshold on delay performance. Different thresholds may be defined for client devices 20 assigned to different priority classes.

More specifically, e2e distribution delay information is used as a constraint when allocating the client devices 20 to different distribution paths. One exemplary objective is to select a distribution path which minimizes the resource consumption (e.g. load) in regard of more sophisticated network resources while ensuring the e2e distribution delay is within a certain pre-defined range. The more sophisticated network resources that have been freed or rendered non-occupied (e.g., in regard of a CDN access network entity) may then be used for services of higher importance, such as emergency services, dedicated services requiring low latency (e.g., for industry automation), and so on. As a side effect, the content distribution costs can often be reduced from the perspective of the content provider as more sophisticated network resources are typically associated with higher content distribution costs.

Let $cost_j$ be a cost metric associated with a resource consumption for delivering content on path j, where j= 1 ... N. It should be noted that the cost metric may be an abstract parameter. The cost parameter may, for example, correspond to resource consumption from the perspective of a particular CDN entity j. As explained above, the cost parameter may at the same time have a direct or indirect relationship to distribution costs from the perspective of a content provider.

The total cost as a result of aggregate transmissions on distribution path j is defined by:

$$cost_j = f(V_j) = (\Sigma_{i=1}^{M} \Sigma_t R_{ij} \cdot \chi_{ij} \cdot t_{ij}), \text{ where:}$$

$R_{ij}$ = video bitrate of client i when using distribution path/CDN entity j;

$\chi_{ij}$ = 1 if client device i is using distribution path/CDN entity j, 0 otherwise;

$t_{ij}$ = amount of time client device i is streaming on path j at representation $R_{ij}$;

$\Sigma_t(\ldots)$: aggregate traffic volume over session time;

$V_j$ = total transmission volume over distribution path j.

The cost is determined periodically based on reported video bitrates (and/or traffic volume) from the client devices 20. The cost function $f$ is typically a non-linear function (e.g., piece-wise linear function or exponential function) of the total transmission volume. Different CDN entities can have different cost functions.

The CDN or content provider may cluster the different CDN entities based on reported delay information from the client devices 20, and thus can have an estimate of the delay performance of each CDN entity for a given period of time (i.e., $d_i \rightarrow d_j$, where i→j). Given that the algorithmic procedure is executed frequently in case of continuous monitoring of paths, the CDN or content provider can continuously update the CDN performances.

The constraints of the CDN selection function are thus to minimize the overall transmission cost over the different distribution paths subject to a quality of service constraint expressed in terms of e2e distribution delay:

$$\min_{\forall i} \sum_{j=1}^{N} cost_j$$

$$\text{s.t. } d_{lower} \leq d_i \leq d_{upper}, \forall i = 1 \ldots M$$

In order to solve the above problem, for each client device i a distribution path j is determined that satisfies the following constraints:

$$\arg\min cost_j$$

$$\text{s.t. } d_{lower} \leq d_i \leq d_{upper}$$

Thus, the CDN selection function determines for each client device i a distribution path j that minimizes the transmission cost while ensuring that the e2e distribution delay is within certain range. The algorithmic procedure is executed iteratively by searching for each client i, i=1 ... M for the lowest cost distribution path.

FIG. 10 illustrates a pseudo-code representation of a method embodiment for selecting the distribution paths/CDN entities for the client devices 20. The method can be executed periodically (e.g., in order of seconds or minutes). The method can be utilized for initial CDN selection as well as for continuous monitoring and dynamically allocating client devices 20 to different distribution paths when needed.

The method proceeds by searching for distribution paths that satisfy the delay constraint and assigning them to the path that minimizes the distribution cost. Note that some client devices 20 will be still allocated to alternative CDN entities for testing purposes.

Figure 11:
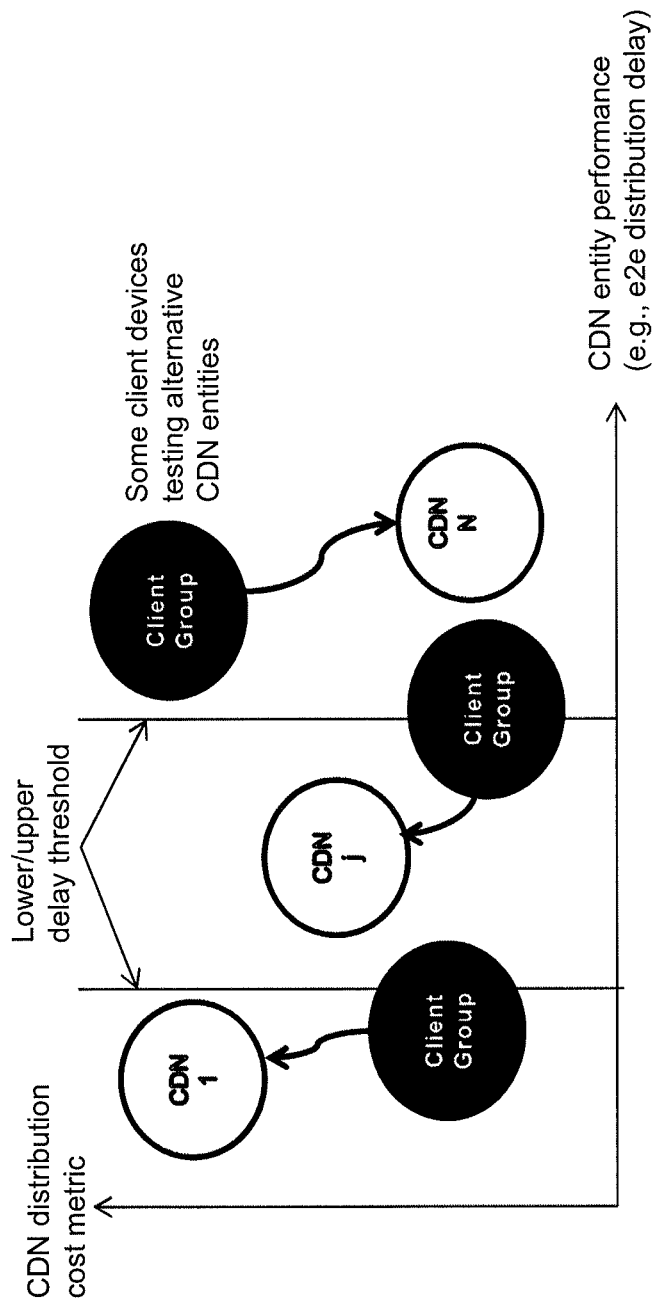
FIG. 11 is a schematic illustration of minimizing a distribution cost metric subject to a distribution delay constraint.

A graphical illustration of the algorithmic procedure is given in FIG. 11. The different CDN entities are clustered in terms of their distribution cost and service performance (here: e2e distribution delay). Groups of client devices 20 are assigned to CDN entities that minimize the distribution cost and ensure that the delay constraint is satisfied. A small group of client devices 20 is used to test alternative CDNs.

5. Algorithm for Cost Optimized CDN Entity Selection Subject to Quality Constraint Similar to the algorithmic procedure in the previous section, where the distribution delay is used as a performance constraint in the CDN selection function, other reported quality metrics such as device-specific video (visual) quality or audio (audible) quality can be applied for cost optimized CDN selection.

The CDN entity selection function may minimize thus the distribution cost subject to a video quality constraint at the client devices 20. This embodiment can be combined with the delay-related embodiment described in the previous section.

Impacts on the Service Performance Monitoring Function

As said, the reported video quality can be used as a performance constraint instead of the distribution delay. In this case, the reported delay, i.e., $d_i$ can be replaced by a reported quality $q_i$. The client devices 20 either directly report the video quality to the performance monitoring function or indirectly via session performance metrics as their streaming bitrate $R_i$. The performance monitoring function may then calculate a corresponding video quality. The client device 20 may also report the screen size used for rendering (or such client-specific information is obtained in another way, such as from a central database). The service performance is then derived from the combination of bitrate with screen size.

Different quality metrics can be used to represent the video quality at the client devices 20 and to define a quality range by the CDN selection function. To determine the video quality, the performance monitoring function (respectively the client device 20) can use the average streaming bitrate with other potentially available playout parameters from the client device 20 (e.g., one or more of device screen size, re-buffering events, etc.). The quality of client device i, referred to as $q_i$, can be thus described as $q_i = g(R_i, \text{screen-size})$, where g is a function of different parameters.

Without loss of generality, the reported quality can be expressed on the Mean Opinion Score (MOS) scale (cf. ITU-T P.NATS models). The quality values can be updated periodically and provided to the cost-optimized CDN selection function.

Impacts on the Traffic Monitoring Function

The traffic monitoring function works independently of the performance constraint (e.g., in terms of distribution delay or video quality) and is directly related to the reported traffic volume by the client devices 20.

Impacts on the CDN Entity Selection Function

The CDN entity selection function clusters the different CDN entities based on reported quality information from the client devices 20. Thus, it can have an estimate of the quality performance of each CDN entity for a given period of time (i.e., $q_i \to q_j$, where $i \to j$).

The delay thresholds, i.e., $d_{upper}$ and $d_{lower}$, can be replaced by a target range on the expected quality, i.e., $q_{upper}$ and $q_{lower}$ and can be directly applied to the cost-optimized CDN selection function (Sect. 4). The cost optimization function, i.e., $cost_j$ as such may remain unchanged. In other words, the same cost optimized CDN selection function can be applied by considering a performance constraint on delay, video quality, or other service performance metric or combination of metrics.

The cost-optimized CDN selection function can be thus expressed by:

$$\operatorname*{Min}_{\forall i} \sum_{j=1}^{N} cost_j$$

$$\text{s.t. } q_{lower} \leq q_i \leq d_{upper}, \forall i = 1 \ldots M$$

The CDN selection function thus determines for each client device 20 a distribution path that minimizes the transmission costs and ensures that the video quality is within a predefined range. A similar procedure as shown in FIG. 11 can be applied.

The optimization algorithm can be executed periodically by the CDN entity selection function or applied when the video quality is outside the desired range. When the quality is above the higher threshold, then the selection function looks for an alternative CDN entity with lower resource consumption. When the quality is below the lower threshold, then the CDN selection function looks for a better CDN entity, which could provide a better quality.

6. Algorithm Extension Based on Access Type

As explained above, the procedures described in Sects. 4 and 5 can in particular consider the access network per CDN. In this case, the performance monitoring function maintains the reported performance information for each CDN together with the access network type (e.g., access connectivity such as Wi-Fi, 3G, DSL, or access provides such as T-Mobile). This allows further categorization of the CDN performance per access type and allows steering the traffic for each client device 20 to the proper CDN with the proper access network performance.

A table can be maintained that lists the performance measure (e.g., average media rendering quality, e2e distribution delay or both) and the corresponding access network type per CDN. The system thus creates a table of path qualities per CDN and access network. For example, the system determines the average quality of a path into the same access network (e.g., T-Mobile or Vodafone) and service through the same CDN (e.g., Akamai or Level3). "The same access network" is determined, for example, by the IP address of the client device 20, as each autonomous domain typically uses a unique IP address block. The client device 20 should also report its connectivity (e.g., HSPA, LTE) so that the selection function can monitor access network specific performance. For instance, when the client device is in HSPA coverage, then the possible quality may be lower than when in LTE coverage. In case of Wi-Fi, the selection function should try to determine whether the client device 20 is in a Fixed BB environment (i.e., at home) or connected via a public hotspot. For the first case, the available access network capacity may be more often secured than in a public hot spot. As such, also security information may be evaluated in connection with CDN entity selection.

In addition to maintaining different performance logs for CDNs based on the CDN network access types, the service performance constraints (i.e., e2e delay range, video quality range, etc.) can be set differently depending on the access network type.

Accordingly, one aspect of the above embodiments provides an e2e distribution delay measurement technique and CDN selection technique for ABR streaming via a CDN. The technique may include an API at the origin server 10 and a function to query the API at the origin server 10 for the timestamp and fingerprint of a media segment. This approach permits estimating the e2e distribution delay at the client device 20 and reporting the delay estimate to a reporting server 50 or CDN selection function. Another aspect of the above embodiments targets at minimizing the distribution cost while ensuring that the service performance (distribution delay, visual quality, audible quality, etc.) is within a predefined target range. Both adaptive HTTP streaming CDNs and non-adaptive HTTP delivery approaches (which support HTTP proxies or not at the client devices) are within the scope of the embodiments.

Many advantages of the present invention will be fully understood from the foregoing description, and it will be apparent that various changes may be made in the form, construction and arrangement of the steps, units and devices described above and without departing from the scope of the invention or without sacrificing all of its advantages. Since the invention can be varied in many ways, it will be recognized that the invention should be limited only by the scope of the following claims.

The invention claimed is:

1. A selecting apparatus configured to select, out of a set of Content Distribution Network (CDN) entities, a CDN entity for distributing content to a client device, wherein content distribution by each CDN entity is associated with a resource consumption, the selecting apparatus comprising:
   a processor, and
   a memory operatively coupled to the processor and storing program code for execution by the processor and configured to cause the selecting apparatus to:
   receive service performance reports for multiple CDN entities of the set of CDN entities; and
   select, upon determining from one or more of the service performance reports that a service performance of a first CDN entity is above a first threshold, a second CDN entity for content distribution to the client device subject to constraints that
   (i) a service performance of the second CDN entity is below a second threshold and above a third threshold, the second threshold and the third threshold being below the first threshold, wherein the service performance of the first CDN entity is better than needed by the client device and the service performance of the second CDN entity is sufficient for the client device; and
   (ii) a resource consumption in regard of the second CDN entity is lower than a resource consumption in regard of the first CDN entity.

2. The selecting apparatus of claim 1, wherein the program code is further configured to cause the selecting apparatus to:
   trigger at least one action that causes the client device to receive content from the selected second CDN entity.

3. The selecting apparatus of claim 2, wherein the at least one action causes the client device to switch content reception from the first CDN entity to the second CDN entity.

4. The selecting apparatus of claim 2, wherein the at least one action comprises indicating the second CDN entity in a manifest file and triggering transmission of the manifest file that indicates the second CDN entity to the client device.

5. The selecting apparatus of claim 1, wherein the service performance reports are received from multiple client devices and wherein the program code is further configured to cause the selecting apparatus to: trigger content distribution from the multiple CDN entities to the multiple client devices to enable reception of the service performance reports for the multiple CDN entities from the multiple client devices.

6. The selecting apparatus of claim 5, wherein to trigger the content distribution from the multiple CDN entities to the multiple client devices, the program code is configured to cause the selecting apparatus to trigger at least one action that causes individual ones of the multiple client devices to receive content from individual ones of the multiple CDN entities.

7. The selecting apparatus of claim 6, wherein the at least one action causes a first number of client devices to receive content from the first CDN entity being lower than a second number of client devices to receive content from the second CDN entity, and wherein the first number of client devices is at least one client device, and the at least one client device enables reception of a service performance report for the first CDN entity.

8. The selecting apparatus of claim 1, wherein the second CDN entity is selected according to constraint (ii) subject to having a minimal resource consumption among a plurality of CDN entities fulfilling at least constraint (i).

9. The selecting apparatus of claim 1, wherein the program code is further configured to cause the selecting apparatus to derive a service performance of a particular CDN entity for a particular client device taking into account:
   (i) one or more service performance metrics reported for the particular CDN entity; and
   (ii) a technical capability of the particular client device, wherein the technical capability of the particular client device is indicative of at least one of a screen size and an audio rendering capability of the particular client device.

10. The selecting apparatus of claim 1, wherein the set of CDN entities comprises at least one of:
   individual CDNs;
   individual access network types per CDN; and
   a combination thereof.

11. The selecting apparatus of claim 1, wherein a service performance is indicative of at least one of a content distribution delay for a particular CDN entity and a media quality for the particular CDN entity.

12. The selecting apparatus of claim 1, wherein a resource consumption is expressed as or derived from at least one of a traffic load parameter of a particular CDN entity and a traffic volume cost indication associated with the particular CDN entity.

13. The selecting apparatus of claim 12, wherein the program code is further configured to cause the selecting apparatus to:
receive, from a set of client devices, traffic volume reports for the set of CDN entities;
aggregate the reported traffic volumes per CDN entity; and
calculate the resource consumption for the particular CDN entity based on the reported traffic volumes aggregated for the particular CDN entity and the traffic volume cost indication for the particular CDN entity.

14. A network node, comprising
the selecting apparatus of claim 1; and
an interface to multiple client devices, the interface being configured to send CDN entity selection instructions for the multiple client devices and to receive the service performance reports for the multiple CDN entities from the multiple client devices.

15. A client device configured to switch from a first Content Distribution Network (CDN) entity to a second CDN entity for content reception, the client device comprising:
a processor, and
a memory operatively coupled to the processor and storing program code for execution by the processor and configured to cause the client device to:
monitor service performance for the first CDN entity while receiving content therefrom;
send a report regarding the service performance monitored for the first CDN entity;
receive an instruction to switch to the second CDN entity upon
(i) a service performance of the first CDN entity being above a first threshold;
(ii) a service performance of the second CDN entity being below a second threshold and above a third threshold, the second threshold and the third threshold being below the first threshold, wherein the service performance of the first CDN entity is better than needed by the client device and the service performance of the second CDN entity is sufficient for the client device; and
(iii) a resource consumption in regard of the second CDN entity being lower than a resource consumption in regard of the first CDN entity; and
switch to the second CDN entity responsive to receipt of the instruction.

16. The client device of claim 15, wherein the program code is further configured to cause the client device to:
monitor a traffic volume of content received from at least one of the first CDN entity and the second CDN entity; and
send a report regarding the monitored traffic volume.

17. A method of selecting, out of a set of Content Distribution Network (CDN) entities, a CDN entity for distributing content to a client device, wherein content distribution by each CDN entity is associated with a resource consumption, the method comprising:
receiving service performance reports for multiple CDN entities of the set of CDN entities; and
selecting, upon determining from one or more of the service performance reports that a service performance of a first CDN entity is above a first threshold, a second CDN entity for content distribution to the client device subject to constraints that
(i) a service performance of the second CDN entity is below a second threshold and above a third threshold, the second threshold and the third threshold being below the first threshold, wherein the service performance of the first CDN entity is better than needed by the client device and the service performance of the second CDN entity is sufficient for the client device; and
(ii) a resource consumption in regard of the second CDN entity is lower than a resource consumption in regard of the first CDN entity.

18. A method of switching a client device from a first Content Distribution Network (CDN) entity to a second CDN entity for content reception, the method being performed by the client device and comprising:
monitoring service performance for the first CDN entity while receiving content therefrom;
sending a report regarding the service performance monitored for the first CDN entity;
receiving an instruction to switch to the second CDN entity upon
(i) a service performance of the first CDN entity being above a first threshold;
(ii) a service performance of the second CDN entity being below a second threshold and above a third threshold, the second threshold and the third threshold being below the first threshold, wherein the service performance of the first CDN entity is better than needed by the client device and the service performance of the second CDN entity is sufficient for the client device; and
(iii) a resource consumption in regard of the second CDN entity being lower than a resource consumption in regard of the first CDN entity; and switching to the second CDN entity responsive to receipt of the instruction.

* * * * *